US012787101B2

(12) United States Patent
Mu

(10) Patent No.: US 12,787,101 B2
(45) Date of Patent: Nov. 3, 2026

(54) DOWNLINK TRANSMISSION CONFIGURATION AND RECEIVING METHODS AND APPARATUSES, COMMUNICATION DEVICE AND STORAGE MEDIUM

(71) Applicant: Beijing Xiaomi Mobile Software Co., Ltd., Beijing (CN)

(72) Inventor: Qin Mu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 301 days.

(21) Appl. No.: 18/692,465

(22) PCT Filed: Sep. 30, 2021

(86) PCT No.: PCT/CN2021/122322
§ 371 (c)(1),
(2) Date: Mar. 15, 2024

(87) PCT Pub. No.: WO2023/050362
PCT Pub. Date: Apr. 6, 2023

(65) Prior Publication Data

US 2024/0397573 A1 Nov. 28, 2024

(51) Int. Cl.
*H04W 68/02* (2009.01)
*H04W 52/02* (2009.01)
(Continued)

(52) U.S. Cl.
CPC ....... *H04W 76/20* (2018.02); *H04W 52/0235* (2013.01); *H04W 68/02* (2013.01);
(Continued)

(58) Field of Classification Search
CPC . H04W 76/20; H04W 52/0235; H04W 68/02; H04W 72/0457; H04W 72/1273;
(Continued)

(56) References Cited

U.S. PATENT DOCUMENTS

2019/0199496 A1* 6/2019 Qin ...................... H04W 72/23
2021/0044408 A1 2/2021 Kubota et al.
(Continued)

FOREIGN PATENT DOCUMENTS

CN 101365191 A 2/2009
CN 113170475 A 7/2021
(Continued)

OTHER PUBLICATIONS

State Intellectual Property Office of the People's Republic of China, Office Action and Search Report Issued in Application No. 202180003192X, Mar. 14, 2025, 13 pages.
(Continued)

*Primary Examiner* — Moo Jeong
*Assistant Examiner* — David Zhijun Sun
(74) *Attorney, Agent, or Firm* — Volpe Koenig

(57) ABSTRACT

A downlink transmission configuration method is performed by an access device, and includes: configuring small data transmission and a paging message, for a preset type of user equipment, on a same initial downlink bandwidth part, or on different time units of different initial downlink bandwidth parts.

7 Claims, 6 Drawing Sheets

S110B: Configure the SDT and the paging message, for a preset type of UE, on different units of different initial DL BWPs

(51) Int. Cl.

| | |
|---|---|
| ***H04W 72/0457*** | (2023.01) |
| ***H04W 72/1273*** | (2023.01) |
| ***H04W 72/563*** | (2023.01) |
| ***H04W 76/20*** | (2018.01) |

(52) U.S. Cl.
CPC ... *H04W 72/0457* (2023.01); *H04W 72/1273* (2013.01); *H04W 72/563* (2023.01)

(58) Field of Classification Search
CPC ........... H04W 72/563; H04W 72/0446; H04W 72/0453; H04W 72/23; H04L 5/0053; H04L 5/0078
See application file for complete search history.

(56) References Cited

U.S. PATENT DOCUMENTS

| | | | | |
|---|---|---|---|---|
| 2021/0105808 | A1 | 4/2021 | Lei et al. | |
| 2021/0243793 | A1* | 8/2021 | Ang | H04W 72/1263 |
| 2022/0022276 | A1* | 1/2022 | Shih | H04L 5/0094 |
| 2022/0408403 | A1* | 12/2022 | Tseng | H04W 76/27 |
| 2023/0413379 | A1* | 12/2023 | Jeon | H04W 72/232 |
| 2024/0292328 | A1* | 8/2024 | Chen | H04W 4/06 |

FOREIGN PATENT DOCUMENTS

| | | | |
|---|---|---|---|
| WO | 2014019235 | A1 | 2/2014 |
| WO | 2016166707 | A1 | 10/2016 |
| WO | 2021/030987 | A1 | 2/2021 |

OTHER PUBLICATIONS

Vivo, “Report of [Post113bis-e][507][SDT] Resource configuration aspects”, R2-2104762, 3GPP TSG-RAN WG2 Meeting #114-electronic, Online, May 19-May 27, 2021, 28 pages.
ISA State Intellectual Property Office of the People’s Republic of China, Written Opinion of the International Searching Authority Issued in Application No. PCT/CN2021/122322 , Apr. 24, 2022, WIPO, 9 pages.
ISA State Intellectual Property Office of the People’s Republic of China, International Search Report Issued in Application No. PCT/CN2021/122322, Apr. 24, 2022, WIPO, 6 pages.
Qualcomm Incorporated.“Discussion on open issues for CG based SDT”, 3GPP TSG-RAN WG2 Meeting #114 electronic R2-2105887, May 27, 2021, 5pages.
Moderator (Ericsson), “FL summary #6 on reduced maximum UE bandwidth for RedCap”, R1-2108498, 3GPP TSG-RAN WG1 Meeting #106-e, e-Meeting, Aug. 16-27, 2021, 142 pages.
LG Electronics Inc., “Separate BWP for Small Data Transmission”, R2-2100782, 3GPP TSG-RAN2#113-e, Online, Jan. 25-Feb. 5, 2021, 3 pages.

* cited by examiner

S110: Configure the SDT and the paging message, for a preset type of UE, on a same initial DL BWP, or on different time units of different initial DL BWPs S110A: Configure the SDT and the paging message, for a preset type of UE, on a same initial DL BWP

DOWNLINK TRANSMISSION CONFIGURATION AND RECEIVING METHODS AND APPARATUSES, COMMUNICATION DEVICE AND STORAGE MEDIUM

CROSS REFERENCE TO RELATED APPLICATIONS

This application is a National Phase of International Application No. PCT/CN2021/122322, filed on Sep. 30, 2021, the entire contents of which are incorporated herein by reference in their entireties.

TECHNICAL FIELD

The present disclosure relates to the field of wireless communication technologies, but is not limited to the field of wireless communication technologies, and in particular to a downlink transmission configuration method and apparatus, a downlink transmission receiving method and apparatus, a communication device and a storage medium.

BACKGROUND

In the 4th generation (4G) mobile communication system of long-term evolution (LTE), two major technologies, including machine type communication (MTC) and narrow band internet of things (NB IoT) have been proposed to support IoT services. These two technologies are mainly aimed at low speed, high latency, and other scenarios. For example, in scenarios such as meter reading and environmental monitoring. At present, the NB IoT can only support a speed of up to a few hundred Kb/s, and the MTC can only support a speed of up to a few Mb/s. With the continuous development of IoT services, for example, the popularity of these services, such as video surveillance, smart homes, wearable devices, and industrial sensor monitoring, these services typically require speeds ranging from 10 Mb/s to 100 Mb/s and also have relatively high latency requirements. However, it is difficult for the MTC technology and the NB IoT technology in the LTE to meet these requirements.

Based on this situation, a new type of user equipment in a new air port of a 5th generation (5G) mobile communication system is proposed in the related art to cover the requirements of mid-range IoT devices. This new type of user equipment is called a reduced capability user equipment (Redcap UE) or a new radio lightweight terminal (NR-lite).

SUMMARY

Embodiments of the present disclosure provide a downlink transmission configuration method and apparatus, a downlink transmission receiving method and apparatus, a communication device, and a storage medium.

According to a first aspect of the embodiments of the present disclosure, there is provided a downlink transmission configuration method, performed by an access device, and including: configuring a small data transmission (SDT) and a paging message, for a preset type of user equipment (UE), on a same initial downlink (DL) bandwidth part (BWP), or on different time units of different initial downlink (DL) bandwidth parts (BWPs).

According to a second aspect of the embodiments of the present disclosure, there is provided a downlink transmission receiving method, performed by a preset type of user equipment (UE), and including: receiving a small data transmission (SDT) and a paging message on a same initial downlink (DL) bandwidth part (BWP), or on different time units of different initial downlink (DL) bandwidth parts (BWPs).

According to a third aspect of the embodiments of the present disclosure, there is provided a downlink transmission receiving method, performed by a preset type of user equipment (UE), and including: in response to a conflict between a time unit for receiving a small data transmission (SDT) and a time unit for listening to a paging message, receiving the SDT or listening to the paging message based on a priority.

According to a fourth aspect of the embodiments of the present disclosure, there is provided a communication device, including a processor, a transceiver, and a memory storing programs, where the programs, when executed by the processor, cause the processor to perform the method of any one of the first to fourth aspects.

According to a fifth aspect of the embodiments of the present disclosure, there is provided a non-transitory computer storage medium storing programs thereon, where the programs, when executed by a processor, cause the processor to perform the method of any one of the first to fourth aspects.

It will be understood that the above general descriptions and subsequent detailed descriptions are merely illustrative and explanatory rather than limiting of the present disclosure.

BRIEF DESCRIPTION OF THE DRAWINGS

The drawings incorporated into the specification to constitute a part of the specification illustrate embodiments consistent with the present disclosure and interpret the principle of the embodiments of the present disclosure together with the specification.

DETAILED DESCRIPTION OF THE EMBODIMENTS

Figures 1, 2A, 2B:
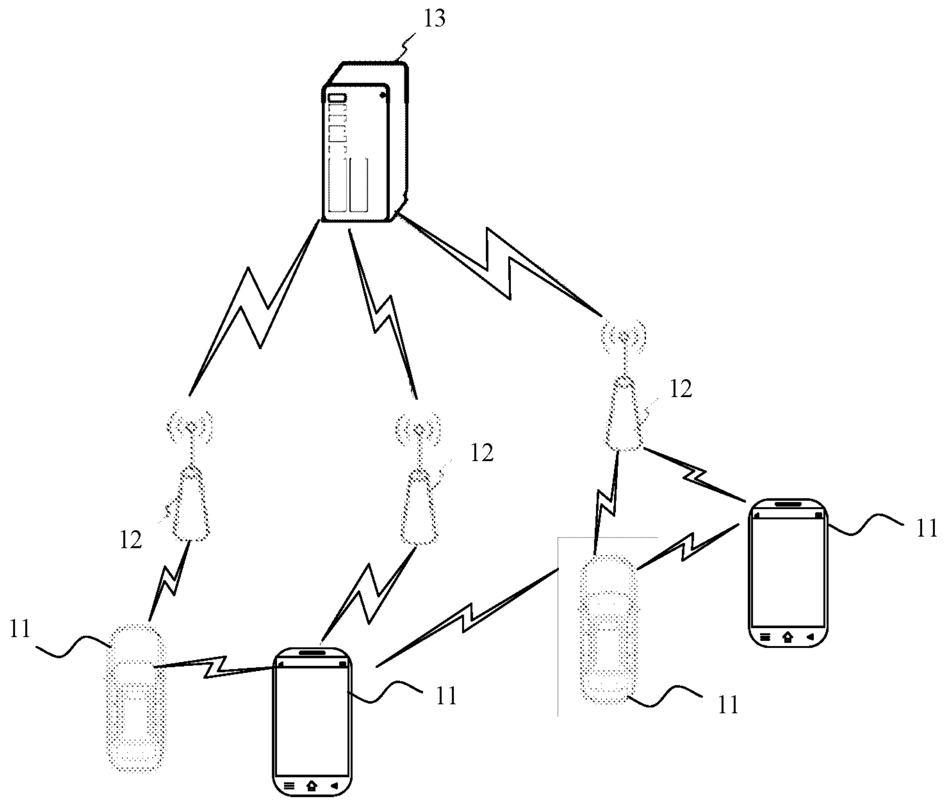
FIG. 1 is a schematic structural diagram illustrating a wireless communication system according to an embodiment of the present disclosure.
FIG. 2A is a schematic flowchart illustrating a downlink transmission configuration method according to an embodiment of the present disclosure.
FIG. 2B is a schematic flowchart illustrating a downlink transmission configuration method according to another embodiment of the present disclosure.

Embodiments will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

The terms used in the present disclosure are used for the purpose of describing particular embodiments only, and are not intended to limit the present disclosure. Terms determined by "a", "the" and "said" in their singular forms in the present disclosure and the appended claims are also intended to include plurality, unless clearly indicated otherwise in the context. It should also be understood that the term "and/or" as used herein refers to and includes any or all possible combinations of one or more of the associated listed items.

It is to be understood that, although the terms "first," "second," "third," and the like may be used in the embodiments of the present disclosure to describe various information, such information should not be limited to these terms. These terms are only configured to distinguish a category of information from another. For example, without departing from the scope of the present disclosure, first information may be referred as second information; and similarly, the second information may also be referred to as the first information. Depending on the context, the term "if" as used herein may be interpreted as "when" or "upon" or "in response to determining".

FIG. 1 is a structural schematic diagram illustrating a radio communication system according to an embodiment of the present disclosure. As shown in FIG. 1, the radio communication system is a communication system based on cellular mobile communication technology, and the radio communication system may include multiple UEs 11 and multiple access devices 12.

The UE 11 may be a device directed toward a user to provide voice and/or data connectivity. The UE 11 be a UE of internet of things, such as a sensor device, a mobile phone, (or called cellular phone), and a computer having a UE of internet of things, such as a fixed, portable, pocket-sized, handheld, or computer-inbuilt or vehicle-mounted apparatus, such as station (STA), subscriber unit, subscriber station, mobile station, mobile, remote station, access point, remote terminal, access terminal, user terminal, user agent, user device, or user equipment. In an embodiment, the UE 11 may also be a device of an unmanned aerial vehicle, or a vehicle-mounted device, for example, may be a trip computer having wireless communication function, or a wireless communication device externally connected to a trip computer. In an embodiment, the UE 11 may be a roadside device, for example, may be a road lamp, signal lamp or another roadside device having wireless communication function.

The access device 12 may be a network-side device in a wireless communication system. The wireless communication system may be a fourth-generation mobile communication technology (4G) system, which is also called Long Term Evolution (LTE) system. In an embodiment, the wireless communication system may also be a 5G system, which is also called new radio (NR) system or 5G NR system. In an embodiment, the wireless communication system may also be a next-generation system of the 5G system. An access network in the 5G system may be referred to as New Generation-Radio Access Network (NG-RAN); or it is an MTC system.

The access device 12 may be an evolved access device (eNB) employed in the 4G system. In an embodiment, the access device 12 may also be an access device adopting centralized distributed architecture (gNB) in the 5G system. When adopting the centralized distributed architecture, the access device 12 usually includes a central unit (CU) and at least two distributed units (DU). In the central unit, protocol stacks of a Packet Data Convergence Protocol (PDCP) layer, a Radio Link Control (RLC) layer and a Media Access Control (MAC) layer are disposed; in the distributed unit, a physical (PHY) layer protocol stack is disposed. The specific implementations of the access device 12 are not limited in the embodiments of the present disclosure.

Wireless connection may be established between the access device 12 and the UE 11 through a wireless air interface. In different implementations, the wireless air interface is a wireless air interface based on the fourth generation mobile communication network technology (4G) standard; or, the wireless air interface is a wireless air interface based on the fifth generation mobile communication network technology (5G) standard, for example, the wireless air interface is a new air interface; or, the wireless air interface may also be a wireless air interface based on a next generation mobile communication network technology standard of 5G.

In some embodiments, end-to-end (E2E) connection may also be established between the UEs 11, for example, in the scenarios of vehicle-to-vehicle (V2V) communication, vehicle-to-Infrastructure (V2I) communication, and vehicle-to-pedestrian (V2P) communication, and the like in vehicle-to-everything (V2X) communication.

In some embodiments, the above wireless communication system may also include a network management device 13.

A plurality of access devices 12 are connected to the network management device 13, respectively. The network management device 13 may be a core network device in the wireless communication system, for example, the network management device 13 may be a Mobility Management Entity (MME) in an Evolved Packet Core (EPC). Alternatively, the network management device may also be another core network device, such as Serving GateWay (SGW), Public Data Network GateWay (PGW), Policy and Charging Rules Function (PCRF), or Home Subscriber Server (HSS), or the like. The implementation morphology of the network management device 13 is not limited in the embodiments of the present disclosure.

As shown in FIG. 2A, an embodiment of the present disclosure provides a downlink transmission configuration method, which is performed by an access device. The method includes the following step S110.

At step S110, a small data transmission (SDT) and a paging message for a preset type of user equipment (UE) are configured on a same initial downlink (DL) bandwidth part (BWP), or on different time units of different initial downlink (DL) bandwidth parts (BWPs).

The access device may include any device within an access network, for example, the access device may specifically be a base station.

For example, the preset type of UE may be any UE that does not support receiving data at once on two or more initial DL BWPs, or does not expect to receive data at once on two or more initial DL BWPs.

The preset type of UE includes, but is not limited to, a reduced capability (Redcap) UE.

The Redcap UE, similar to the IoT device in the LTE, is typically based on a 5G new radio lightweight terminal (NR-lite) and typically needs to meet the following requirements: low cost, low complexity, some coverage enhancement, and power savings. The UE is indicated to support smaller bandwidths, e.g., limited to 5 M Hz or 10 M Hz, or to limit the size of the NR-lite buffer, and thus the size of the transmission block per receipt, etc. The UE can be optimized for power savings. Possible optimizations for power savings may include simplifying the communication process and reducing the number of times the NR-lite user has to detect the downstream control channel, etc.

The SDT herein includes at least the downlink transmission of the SDT. The downlink transmission of the SDT may include feedback of the uplink transmission of the SDT, transmission scheduling, and/or physical downlink shared channel (PDSCH) transmission. The feedback of the uplink transmission of the SDT includes, but is not limited to, hybrid automatic repeat request (HARQ) feedback sent by the physical downlink control channel (PDCCH). The HARQ feedback may include acknowledgment (ACK) feedback indicating successful transmission and/or non acknowledgment (NACK) feedback. The HARQ feedback can be based on a transmission block (TB) or code block group (CBG).

The transmission scheduling includes, but is not limited to, at least one of PDCCH scheduling, physical uplink control channel (PUCCH) scheduling, PDSCH scheduling, or PUSCH scheduling transmitted through PDCCH.

Configuration information for configuring the SDT and the paging message for the preset type of UE on the same initial DL BWP or different time units of different initial DL BWPs can be transmitted to the preset type of UE through various message, for example, through a system message, a radio resource control (RRC) message, or a medium access control (MAC) control element (CE) message, etc. Of course, this is only an example, and the implementation is not limited thereto.

For example, as shown in FIG. 2B, an embodiment of the present disclosure provides a downlink transmission configuration method, which may include the following step S110A.

At step S110A, the SDT and the paging message for the preset type of UE are configured on the same initial DL BWP.

If the SDT and the paging message are configured on the same initial DL BWP, the preset type of UE can receive the SDT and the paging message on the same time unit and/or different time units on an initial DL BWP.

Figure 2C:
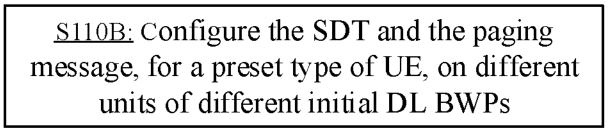
FIG. 2C is a schematic flowchart illustrating a downlink transmission configuration method according to yet another embodiment of the present disclosure.

As shown in FIG. 2C, an embodiment of the present disclosure provides a downlink transmission configuration method, which may include the following step S110B.

At step S110B, the SDT and the paging message for the preset type of UE are configured on different time units on different initial DL BWPs.

If the SDT and the paging message for the preset type of UE are configured on different time units on different initial DL BWPs, the preset type of UE can switch to the initial DL BWP for transmitting the SDT or to the initial DL BWP for transmitting the paging message on the corresponding time unit.

In this embodiment, the time unit can be any size of time resource unit in the time domain. For example, the time unit can be a time slot, a sub-time slot, or symbol.

In some embodiments, the step S110B may include: based on a duration required for the preset type of UE to switch between different BWPs, the SDT and the paging message are configured on the different units of the different initial DL BWPs, where a time interval between a time unit for the SDT and a time unit for the paging message is greater than or equal to the duration required for the preset type of UE to switch between the different BWPs.

The time interval between the time unit for receiving the SDT and the time unit for listening to the paging message needs to be greater than or equal to the duration required for the preset type of UE to switch between the different BWPs. Therefore, it can be ensured that the preset type of UE is able to successfully listen to the paging message and receive the SDT on different time units of different initial DL BWPs.

In some embodiments, the preset type of UE may include at least one of: a reduced capability UE; a UE which is prohibited from configuring the SDT and the paging message on a same time unit of the different initial DL BWPs; or a UE which does not expect to configure the SDT and the paging message on a same time unit of the different initial DL BWPs.

The reduced capability UE herein is the aforementioned Redcap UE.

In some embodiments, communication standard protocols or private protocols or communication carriers, etc., predetermine that: some UEs have downlink transmissions of SDTs and paging message cooperating with UEs on the same time unit of different initial DL BWPs, or UEs themselves report UEs that do not expect to configure the SDTs and the paging message on the same time unit of different initial DL BWPs.

Figure 3A:
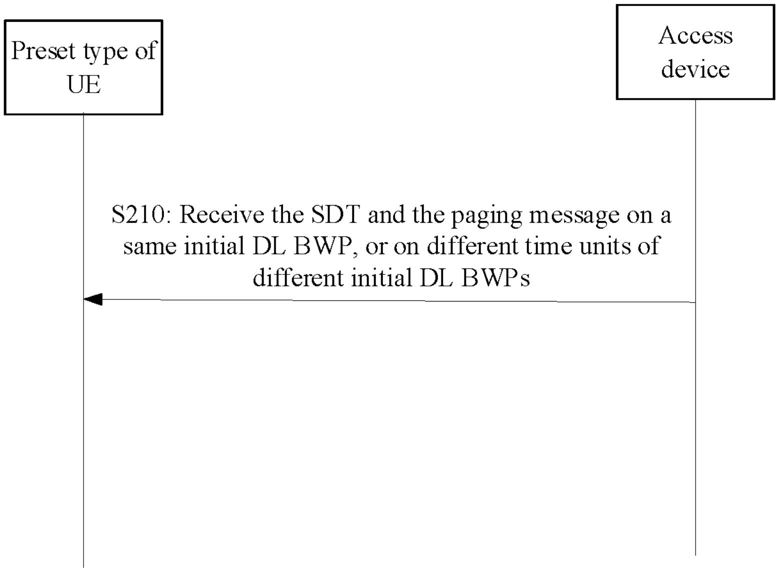
FIG. 3A is a schematic flowchart of a downlink transmission receiving method according to an embodiment of the present disclosure.

As shown in FIG. 3A, an embodiment of the present disclosure provides a downlink transmission receiving method, which is performed by a preset type of UE. The method may include the following step S210.

At step S210, SDT and a paging message are received on a same initial DL BWP, or on different time units of different initial DL BWPs.

The preset type of UE herein may be: a reduced capability UE, where the reduced capability UE herein is the aforementioned Redcap UE; a UE which is prohibited from configuring the SDT and the paging message on a same time unit of the different initial DL BWPs; or a UE which does not expect to configure the SDT and the paging message on a same time unit of the different initial DL BWPs.

Figure 3B:
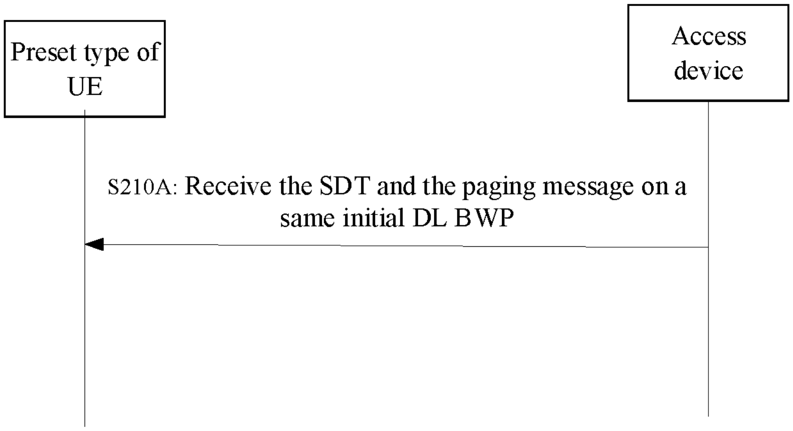
FIG. 3B is a schematic flowchart illustrating a downlink transmission receiving method according to another embodiment of the present disclosure.

As shown in FIG. 3B, an embodiment of the present disclosure provides a downlink transmission receiving method, which may include the following step S210A.

At step S210A, the SDT and the paging message are received on the same initial DL BWP.

The preset type of UE receives the SDT and the paging message on the same initial DL BWP, so that the preset type of UE can receive the SDT and listen to the paging message on the same time unit or different time units without switching the initial DL BWP.

Figure 3C:
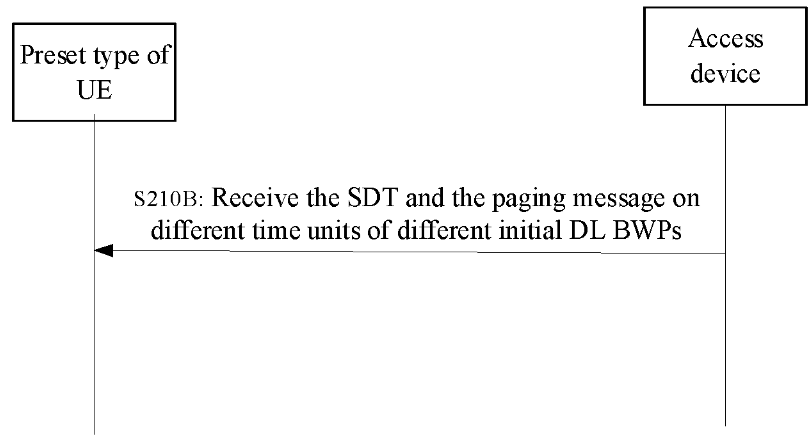
FIG. 3C is a schematic flowchart illustrating a downlink transmission receiving method according to yet another embodiment of the present disclosure.

As shown in FIG. 3C, an embodiment of the present disclosure provides a downlink transmission receiving method, which may include the following step S210B.

At step S210B, the SDT and the paging message are received on different time units of different initial DL BWPs.

The preset type of UE receives the SDT and listens to the paging message on different initial DL BWPs. This can solve the failure of SDT receipt and/or the failure of listening to the paging message caused by the preset type of UEs that does not support or does not expect to receive the SDT and listen to the paging message on the same time unit of different initial DL BWPs.

In some embodiments, the time interval between a time unit for the SDT and a time unit for the paging message is greater than or equal to the duration required for the preset type of UE to switch between the different BWPs. That is, the time interval between the time unit for receiving the SDT and the time unit for listening to the paging message is greater than or equal to the duration required for the preset type of UE to switch between the different BWPs.

The preset type of UE may include one or more communication modules. For example, the preset type of UE has a communication module. The communication module may include an antenna and a radio frequency (RF) circuit connected to the antenna. After working parameters of the communication module are adjusted, the communication module can only transmit and receive signals corresponding to BWP transmission. For example, the working parameters include, but are not limited to, a length of array of the antenna, etc. Of course, these are examples, and any known parameters could be used.

As an example, the preset type of UE has multiple communication modules. Due to the power consumption and/or load considerations of UE, at a given time, the preset type of UE may have only one communication module in operation, and other communication modules may be in non-operating states, such as off or sleep. If the preset type of UE switches to a communication module in working mode to switch to an initial DL BWP in working mode, this also requires some switching time.

Considering the time required for the preset type of UE to switch to the initial DL BWP in working, the downlink transmission of the SDT and the paging message of the preset type of UE are configured on different initial DL BWPs. Firstly, the time unit for the preset type of UE for receiving the SDT and the time unit for the predefined type of UE for listening to the paging message will be configured on different time domain resources. Secondly, the time interval between the time unit for receiving the SDT and the time unit for listening to the paging message also needs to be at least equal to or even greater than the duration required for the preset type of UE to switch between different initial DL BWPs, such that the success rate of receiving the SDT and the success rate of listening to the paging message for the predetermined type of UE are in order to ensured.

Figure 4:
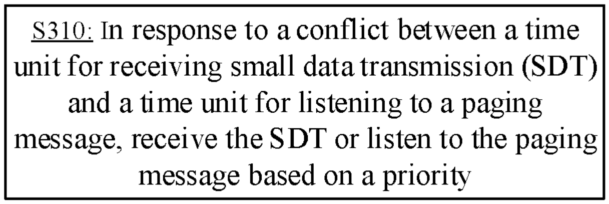
FIG. 4 is a schematic flowchart illustrating a downlink transmission receiving method according to still another embodiment of the present disclosure.

As shown in FIG. 4, an embodiment of the present disclosure provides a downlink transmission receiving method, which is performed by a preset type of UE. The method may include the following step S310.

At step S310, in response to a conflict between a time unit for receiving SDT and a time unit for listening to a paging message, based on a priority, the SDT is received, or the paging message is listened.

In some embodiments, if the preset type of UE detects a conflict between the time unit for receiving the SDT and the time unit for listening to the paging message, whether to receive the SDT or listen to the paging message based on the priority will be determined. Therefore, the network side may not need to consider this conflict when configuring the time unit for receiving the SDT and the time unit for listening to the paging message for the preset type of UE.

The conflict between the time unit for receiving SDT and the time unit for listening to the paging message herein includes, but is not limited to that: the time unit for receiving the SDT and the time unit for listening to the paging message are on the same time unit of different initial DL BWPs; and/or, the time unit for receiving the SDT and the time unit for listening to the paging message are on the first time unit and the second time unit of different initial DL BWPs, respectively, and the time interval between the first time unit and the second time unit is smaller than the duration required for the preset type of UE to switch between different initial DL BWPs.

The mentioned embodiments are only examples of the time unit for receiving the SDT and the time unit for listening to the paging message, and the specific implementation is not limited thereto.

In some embodiments, the priority may be a special priority set specifically to resolve the conflict between the time unit for receiving the SDT and the time unit for listening to the paging message for the preset type of UE.

In other embodiments, the priority may be a shared other priority to resolve the conflict between the time unit for receiving the SDT and the time unit for listening to the paging message. The shared priority may include: a priority of any transmission parameter or attribute of the preset type of UE for receiving the SDT and the paging message. For example, the shared priority may be: a priority for channel based on the transmission channel of the SDT and the transmission channel of the paging message, and the like. If another priority is shared, the network side does not need to set a priority specifically for resolving the conflict between the time unit for receiving the SDT and the time unit for listening to the paging message for the preset type of UE, such that the signaling overhead and the configuration operation of the network side are reduced.

In some embodiments, the priority includes at least one of: a priority configured by a network side, or a predefined priority.

The priority configured by a network side may be a special priority and/or a shared priority.

The predefined priority may be a special priority and/or a shared priority. For example, the predefined priority may include a priority predefined in a standard protocol or a private protocol, or a priority pre-established in a base station or a UE, etc.

In some embodiments, the priority includes at least one of: a priority for BWP; a priority for service type; a priority for channel; a priority for arrival time, where an arrival time is positively related to a priority; or a priority for service and channel.

In some embodiments, when the time unit for receiving the SDT and the time unit for listening to the paging message for the preset type of UE are on different initial DL BWPs, whether to prioritize the receiving the SDT or to prioritize the listening to the paging message can be determined directly based on the priority configured by a network side or the predefined priority of the initial DL BWP.

For example, if the priority of the initial DL BWP on which the time unit for receiving the SDT is higher than the priority of the initial DL BWP on which the time unit for listening to the paging message is, the preset type of UE will, in case of the above-mentioned conflict, prioritize the receiving the SDT. If the priority of the initial DL BWP on which the time unit for receiving the SDT is lower than the priority of the initial DL BWP on which the time unit for listening to the paging message is, the preset type of UE will, in case of the above-mentioned conflict, prioritize the listening to the paging message.

The priority for service type indicates the priority of the services to which the SDT and the paging message belong, or the priority of the services configured for the SDT and the paging message.

In an embodiment, the SDT relates to a data transmission, and the paging message is configured for paging the UE to enable the UE to switch from an RRC non-connected state to an RRC connected state. The RRC non-connected state includes, but is not limited to: an RRC idle state and/or an RRC inactive state. The paging message may be sent by one or more paging occasions (POs). The priority for service of all SDTs may be set to be higher than the priority for service of the paging message.

In another embodiment, the priority for service may be set based on the service content of the SDT, e.g., the service content of the SDT includes that: ultra reliable and low latency communication (URLLC) and enhanced mobile broadband (eMBB), where the service priority of the URLLC may be higher than that of the eMBB. In this case, when the preset type of UE finds that the time unit for receiving the SDT conflicts with the time unit for listening to the paging message, it will prioritize the receiving the SDT without listening to the paging message if the service content of the SDT is the URLLC; and it will prioritize the listening to the paging message without receiving the SDT if the service content of the SDT is the eMBB.

The channel for transmitting the SDT and the channel for transmitting the paging message both include PDSCH and/or PDCCH. In some embodiments, different downlink channel configurations have different channel priorities, and the preset type of UE may directly multiplex the priority for channels on which the SDT and the paging message are into a priority for resolving the conflict between the time unit for receiving the SDT and the time unit for listening to the paging message. In some embodiments, there is overlap between the time unit for the SDT and the time unit for the paging message, but only partial overlap or the time interval is less than the duration required for the preset type of UE to switch between different initial DL BWPs. Therefore, there is still a distinction between the time unit for the SDT and the time unit for the paging message. The arrival time herein refers to a starting time of the time unit for receiving the SDT and the time unit for listening to the paging message, and there is the conflict between the time unit for receiving the SDT and the time unit for listening to the paging message. In this embodiment, the arrival time is positively related to a priority, that is, the earlier the arrival time, the higher the priority, and the later the arrival time, the lower the priority. In this case, when the preset type of UE detects the conflict, if the arrival time of the time unit for receiving the SDT is earlier than that of the time unit for listening to the paging message, the priority will be given to the receiving the SDT; if the arrival time of the time unit for receiving the SDT is later than that of the time unit for listening to the paging message, the priority will be given to listening to the paging message. When the preset type of UE detects the conflict, if the arrival time of time unit for receiving the SDT and that of the time unit for listening to the paging message are the same, it can determine whether to prioritize the receiving the SDT or the listening to the paging message based on other priority, alternatively, randomly select or follow a preset setting to prioritize the receiving the SDT or the listening to the paging message.

In the embodiments of the present disclosure, the priority for service and channel is a priority that simultaneously considers both the channel type and the service type, so that when resolving the aforementioned conflict, the preset type of UE can simultaneously consider both the channel and the service, thereby improving the communication quality of the preset type of UE.

For example, regarding a priority for service type, the priority for service type of the SDT is higher than the priority for service type of the paging message. If the priority for service of the SDT is higher than that of the paging message, the preset type of UE will receive the SDT first and determine the transmission of service data first.

In some embodiments, regarding a priority for channel, the priority for channel of the PDSCH is higher than that of the PDCCH, alternatively, the priority for channel of the PDSCH is lower than that of the PDCCH.

The channel for transmitting the SDT and the channel for transmitting the paging message can both be a PDSCH and/or a PDCCH.

In an embodiment, the channel priority of PDSCH can be set higher than that of PDCCH, or the channel priority of PDSCH can be set lower than that of PDCCH.

For example, regarding the priority for service and channel, there is at least one of the following: for PDCCH transmission of the SDT, a priority of the SDT is higher than a priority of a wake-up signal of the paging message; for the PDCCH transmission of the SDT, the priority of the SDT is higher than a priority of the PDCCH transmission of the paging message; for the PDCCH transmission of the SDT, the priority of the SDT is higher than a priority of PDSCH transmission of the paging message; for PDSCH transmission of the SDT, the priority of the wake-up signal of the paging message is higher than the priority of the SDT; for the PDSCH transmission of the SDT, a priority of PDCCH transmission of the paging message is higher than the priority of the SDT; or for the PDSCH transmission of the SDT, the priority of the SDT is higher than the priority of the PDSCH transmission of the paging message.

In some embodiments, the preset type of UE simultaneously considers both channel priority and service priority, thereby determining from two aspects whether to prioritize the receiving the SDT or the listening to the paging message when the time unit for receiving the SDT conflicts with the time unit for listening to the paging message.

The wake-up signal of the paging message is generally transmitted at a point in time prior to the transmitting the paging message to indicate that the preset type of UE needs to listen to the paging message corresponding to the wake-up signal.

Figure 5:
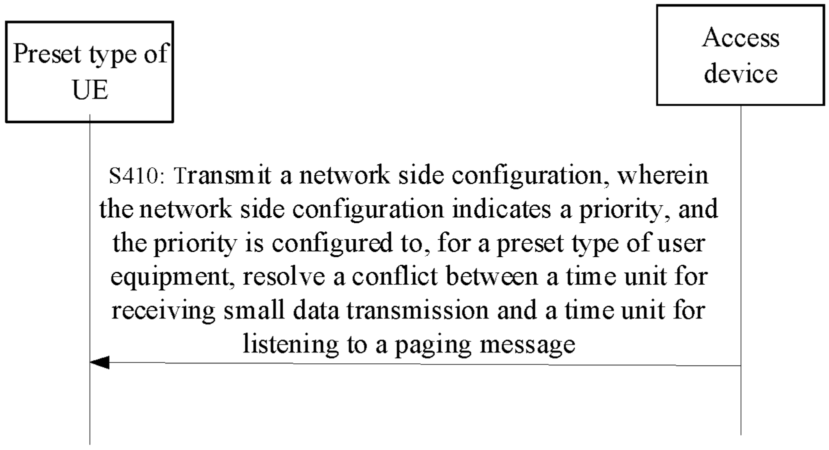
FIG. 5 is a schematic flowchart illustrating a downlink transmission receiving method according to still another embodiment of the present disclosure.

As shown in FIG. 5, an embodiment of the present disclosure provides a downlink transmission configuration method, which is performed by an access device, and the method includes the following step S410.

At step S410, a network side configuration is transmitted, where the network side configuration indicates a priority, and the priority is configured to, for a preset type of user equipment, resolve a conflict between a time unit for receiving small data transmission and a time unit for listening to a paging message.

The access device includes, but is not limited to: a base station, etc.

The network side configuration can resolve the conflict between the time unit for receiving the SDT and the time unit for listening to the paging message mentioned in any of the aforementioned embodiments by explicitly indicating and/or implicitly indicating a preset type of UE.

The network side configuration may be broadcast, multicast, or unicast.

For example, the network side configuration can be carried in a system information block (SIB). The SIB may be a main message block or any SIB other than the main message block. By means of broadcasting, the preset type of UE may preferably know how to resolve the conflict between the time unit for the SDT and the time unit for the paging message when the preset type of UE has not yet been connected to the cell.

In some embodiments, the network side configuration includes: a SIB configuration; a RRC configuration; a MAC CE configuration; and a downlink control information (DCI) configuration.

The SIB configuration means the network side configuration carried in the SIB.

The RRC configuration means the network-side configuration carried in any type of RRC message.

The MAC CE configuration means the network side configuration carried in the MAC CE.

The DCI configuration means the network side configuration carried in the DCI.

The embodiments of the present disclosure provide a method for receiving SDT and listening to a paging message, which is configured to solve the problem that a preset type of UE cannot simultaneously receive the SDT and listen to the paging message on the same time unit of different initial DL BWPs.

Mode 1

The network is prohibited from appearing at the same time unit to allow the UE to receive the paging message and the downlink transmission of the SDT on different initial DL BWPs, or the UE does not expect to receive the paging message and the SDT on the same time unit of different initial DL BWPs. The fact that the network is prohibited from configuring the SDT and the paging message on the same time unit of different initial DL BWPs, or that the UE does not expect to receive the paging message and the SDT on different initial DL BWPs, can be realized by the transmission configuration of the SDT and the paging message.

Receiving the paging message may include receiving a wake-up signal from the UE before receiving a paging message, a paging message transmitted by the PDCCH, and/or a paging message transmitted by the PDSCH.

Receiving the SDT can include: monitoring a search space that needs to be monitored after uplink transmission for the SDT. The search space may include: an uplink hybrid automatic repeat request (HARQ) feedback PDCCH sent by the PDCCH, as well as scheduling PDCCH transmission for the downlink data, and PDSCH transmissions for the downlink data.

The above-mentioned transmission configuration may include at least one of Mode 1.1 or Mode 1.2.

Mode 1.1, the initial DL BWP for receiving the paging message and the initial DL BWP for receiving the SDT need to be on the same initial DL BWP.

Mode 1.2, receiving the paging message and receiving the SDT on different initial DL BWPs are allowed, but with different time units. The receiving time unit for the SDT and the listening time unit for the paging message also need to include a delay for the UE to switch between the different BWPs.

Mode 2

The UE decides which information is prioritized to be received based on the network side configuration.

The network side (e.g., a radio access network side, the radio access network side includes a network device including but being not limited to an access device such as a base station), may configure the transmission configuration for the UE to receive the SDT and the paging message based on the current communication resources, the network load and/or the system capacity, etc., and when there is a conflict between receiving the SDT and listening to the paging message, the network side also configures the priority of how to resolve the conflict. This priority will be transmitted to the UE through the network side configuration. That is, when the time unit for the SDT and the time unit for the paging message partially or completely overlap, and the transmission BWP for the SDT and the transmission BWP for the paging message are different initial DL BWP, the network side configures the priority for the conflict.

Mode 3

Based on the priority, a message or a channel with high priority is received by the UE first. The priority herein can be specifically indicated by different network-side configurations.

3.1, the priority is set based on a BWP. For example, a message transmitted on the first initial DL BWP has a higher priority than a message transmitted on the second initial DL BWP (RedCap-specific initial DL BWP).

3.2, the priority is set based on a service type. For example, all downlink transmissions related to the SDT have higher priority than the downlink transmission related to the paging message.

3.3, the priority is set based on a channel type. For example, the receiving of all PDSCH has a higher priority than the monitoring of the PDCCH.

3.4, the priority is set based on an arrival time for service. For example, if the first downlink receipt of a service is started first, the subsequent receipt of this service is prioritized over the downlink receipt of other service. For example, for the receipt of the paging message, if the wake-up message is received earlier than the downlink feedback corresponding to the SDT, all downlink receipts related to the paging message are prioritized over the downlink receipt of the SDT until the end of the PDSCH transmission of the paging message.

3.5, the receipt priorities are defined for different services, channels, etc., and two examples are shown in Table 1.

TABLE 1

| SDT | Paging message | Priority |
|---|---|---|
| monitoring of PDCCH in SDT | wake-up signal in the paging message | SDT PDCCH > wake-up signal |
| | paging message PDCCH | SDT PDCCH > paging message PDCCH |
| | paging message PDSCH | SDT PDCCH > paging message PDSCH |
| | wake-up signal in the paging messages | wake-up signal > SDT PDSCH |
| monitoring of PDSCH in SDT | paging message PDCCH | paging message PDCCH > SDT PDSCH |
| | paging message PDSCH | SDT PDSCH > paging message PDSCH |
| . . . | . . . | . . . |

It will be noted that each element in Table 1 can be used individually or in combination with other elements in Table 1. Specific priority configurations for both channel and service can include, but are not limited to, the examples in Table 1.

Also, it will be noted that the "1, 2, and 3" in the modes 1, 2, and 3 are only used to differentiate between the different modes, and do not represent which mode is the more preferred mode or the more important mode.

Figure 6:
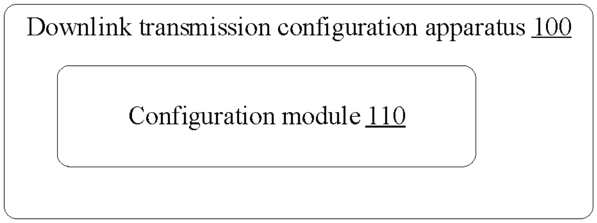
FIG. 6 is a schematic structural diagram illustrating a downlink transmission configuration apparatus according to an embodiment of the present disclosure.

As shown in FIG. 6, an embodiment of the present disclosure provides a downlink transmission configuration apparatus 100, and the apparatus includes a configuration module 110.

The configuration module 110 is configured to configure a SDT and a paging message, for a preset type of UE, on a same initial DL BWP, or on different time units of different initial DL BWPs.

The downlink transmission configuration apparatus 100 can be applied to the access device.

In some embodiments, the configuration module 110 may be a program module. After the program module is executed by a processor, the downlink transmission of the SDT and the paging message of the preset type of UE will be configured on the same initial DL BWP or on different time units of different initial DL BWPs. This reduces the phenomenon of at least one transmission failure caused by the conflict between receiving the SDT and listening to the paging message of the preset type of UE on the same time unit of different initial DL BWPs, and improves communication quality.

In other embodiments, the configuration module 110 may be a software and hardware combination module. The software and hardware combination module includes, but is not limited to: various programmable arrays. The programmable array includes, but is not limited to: a field programmable array and/or a complex programmable array.

In some other embodiments, the configuration module 110 may further include a pure hardware module. The pure hardware module includes, but is not limited to, a specialized integrated circuit.

In some embodiments, the configuration module 110 is configured to configure, based on a duration required for the preset type of UE to switch between different BWPs, the SDT and the paging message on the different units of the different initial DL BWPs, where a time interval between a time unit for the SDT and a time unit for the paging message is greater than or equal to the duration required for the preset type of UE to switch between the different BWPs.

In some embodiments, the preset type of UE includes at least one of: capability reduction UE; a UE which is prohibited from configuring the SDT and the paging message on a same time unit of the different initial DL BWPs; or a UE which does not expect to configure the SDT and the paging message on a same time unit of the different initial DL BWPs.

Figure 7:
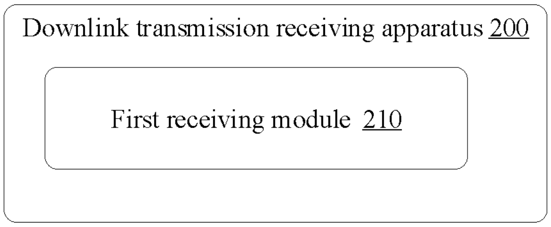
FIG. 7 is a schematic structural diagram illustrating a downlink transmission receiving apparatus according to an embodiment of the present disclosure.

As shown in FIG. 7, an embodiment of the present disclosure provides a downlink transmission receiving apparatus 200, and the apparatus 200 includes a first receiving module 210.

The first receiving module 210 is configured to receive a SDT and a paging message on a same initial downlink bandwidth part, or on different time units of different initial downlink bandwidth parts.

The downlink transmission receiving apparatus 200 may be included in a preset type of UE.

In some embodiments, the first receiving module 210 may be a program module. After the program module is executed by a processor, receiving the SDT and the paging message on different time units of different initial DL BWPs or on the same time unit or different time units of the same initial DL BWP, respectively, can be implemented.

In some other embodiments, the first receiving module 210 may be a software and hardware combination module. The software and hardware combination module includes, but is not limited to: various programmable arrays. The programmable array includes, but is not limited to: a field programmable array and/or a complex programmable array.

In some other embodiments, the first receiving module 210 may be a pure hardware module. The pure hardware module includes, but is not limited to, a specialized integrated circuit.

In some embodiments, a time interval between a time unit for the SDT and a time unit for the paging message is greater than or equal to the duration required for the preset type of UE to switch between the different BWPs.

Figure 8:
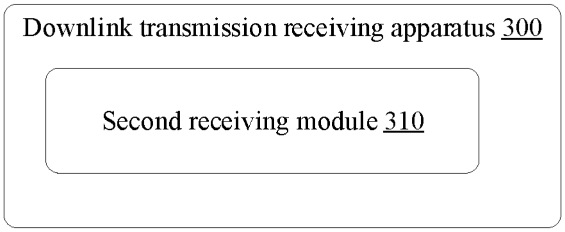
FIG. 8 is a schematic structural diagram illustrating a downlink transmission receiving apparatus according to another embodiment of the present disclosure.

As shown in FIG. 8, an embodiment of the present disclosure provides a downlink transmission receiving apparatus 300, and the apparatus 300 includes a second receiving module 310.

The second receiving module 310 is configured to, in response to a conflict between a time unit for receiving a SDT and a time unit for listening to a paging message, receive the SDT or listening to the paging message based on a priority.

In some embodiments, the second receiving module 310 may be a program module. After the program module is executed by a processor, in response to a conflict between a time unit for receiving a SDT and a time unit for listening to a paging message, based on a priority, the SDT is received, or the paging message is listened.

In some other embodiments, the second receiving module 310 may be a software and hardware combination module. The software and hardware combination module includes, but is not limited to: various programmable arrays. The programmable array includes, but is not limited to: a field programmable array and/or a complex programmable array.

In some other embodiments, the second receiving module 310 may be a pure hardware module. The pure hardware module includes, but is not limited to, a specialized integrated circuit.

In some embodiments, the priority includes at least one of: a priority configured by a network side, or a predefined priority.

In some embodiments, the priority includes at least one of: a priority for BWP; a priority for service type; a priority for channel; a priority for arrival time, where an arrival time is positively related to a priority; or a priority for service and channel.

In some embodiments, a priority for service type of the SDT is higher than a priority for service type of the paging message.

In some embodiments, a priority for a channel of a physical downlink shared channel is higher than a priority for a channel of a physical downlink control channel; or a priority for a channel of a physical downlink shared channel is lower than a priority for a channel of a physical downlink control channel.

In some embodiments, regarding the priority for service and channel, at least one of: for physical downlink control channel (PDCCH) transmission of the SDT, a priority of the SDT is higher than a priority of a wake-up signal of the paging message; for the PDCCH transmission of the SDT, the priority of the SDT is higher than a priority of the PDCCH transmission of the paging message; for the PDCCH transmission of the SDT, the priority of the SDT is higher than a priority of physical downlink shared channel (PDSCH) transmission of the paging message; for PDSCH transmission of the SDT, the priority of the wake-up signal of the paging message is higher than the priority of the SDT; for the PDSCH transmission of the SDT, a priority of PDCCH transmission of the paging message is higher than the priority of the SDT; or for the PDSCH transmission of the SDT, the priority of the SDT is higher than the priority of the PDSCH transmission of the paging message.

Figure 9:
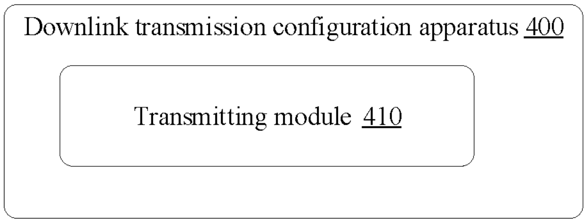
FIG. 9 is a schematic structural diagram of a downlink transmission configuration apparatus according to another embodiment of the present disclosure.

As shown in FIG. 9, an embodiment of the present disclosure provides a downlink transmission configuration apparatus 400, and the apparatus 400 includes a transmitting module 410.

The transmitting module 410 is configured as a network side configuration, where the network side configuration indicates a priority, and the priority is configured to, for a preset type of user equipment, resolve a conflict between a time unit for receiving small data transmission and a time unit for listening to a paging message.

In some embodiments, the transmitting module 410 may be a program module. After the program module is executed by a processor, the conflict caused by the time unit for the SDT and the time unit for the paging message being configured on the same time unit for different initial DL BWPs are resolved.

In some other embodiments, the transmitting module 410 may be a software and hardware combination module. The software and hardware combination module includes, but is not limited to: various programmable arrays. The programmable array includes, but is not limited to: a field programmable array and/or a complex programmable array.

In some other embodiments, the transmitting module 410 may be a pure hardware module. The pure hardware module includes, but is not limited to, a specialized integrated circuit.

In some embodiments, the network side configuration includes: a SIB configuration; a RRC configuration; a MAC CE configuration; and a DCI configuration.

It is further possible for the downlink transmission configuration apparatuses 100 and 400 of FIGS. 6 and 9 to be combined together into one downlink transmission configuration apparatus that includes both the configuration module 110 and the transmitting module 410 (combination not shown). Additionally, it is also possible for the downlink transmission receiving apparatuses 200 and 300 of FIGS. 7 and 8 to be combined together into one downlink transmission receiving apparatus that includes both the first receiving module 210 and the second receiving module 310 (combination not shown).

An embodiment of the present disclosure provides a communication device, which includes: a memory storing executable instructions; and a processor. Where the instructions, when executed by the processor, cause the processor to perform the downlink transmission configuration method and/or the downlink transmission receiving method provided by any of the embodiments.

The processor may include various types of storage medium, and the storage medium may be a non-transitory computer-readable storage medium capable of continuing to memorize the information stored thereon after the communication device is powered down.

Here, the communication device includes: an access device, a UE, or a core network device.

The processor can be connected to the memory via a bus or other means for reading executable programs stored on the memory, for example, at least one of the methods shown in FIGS. 2A to 2C, 3A to 3C, and 4 to 5.

Figure 10:
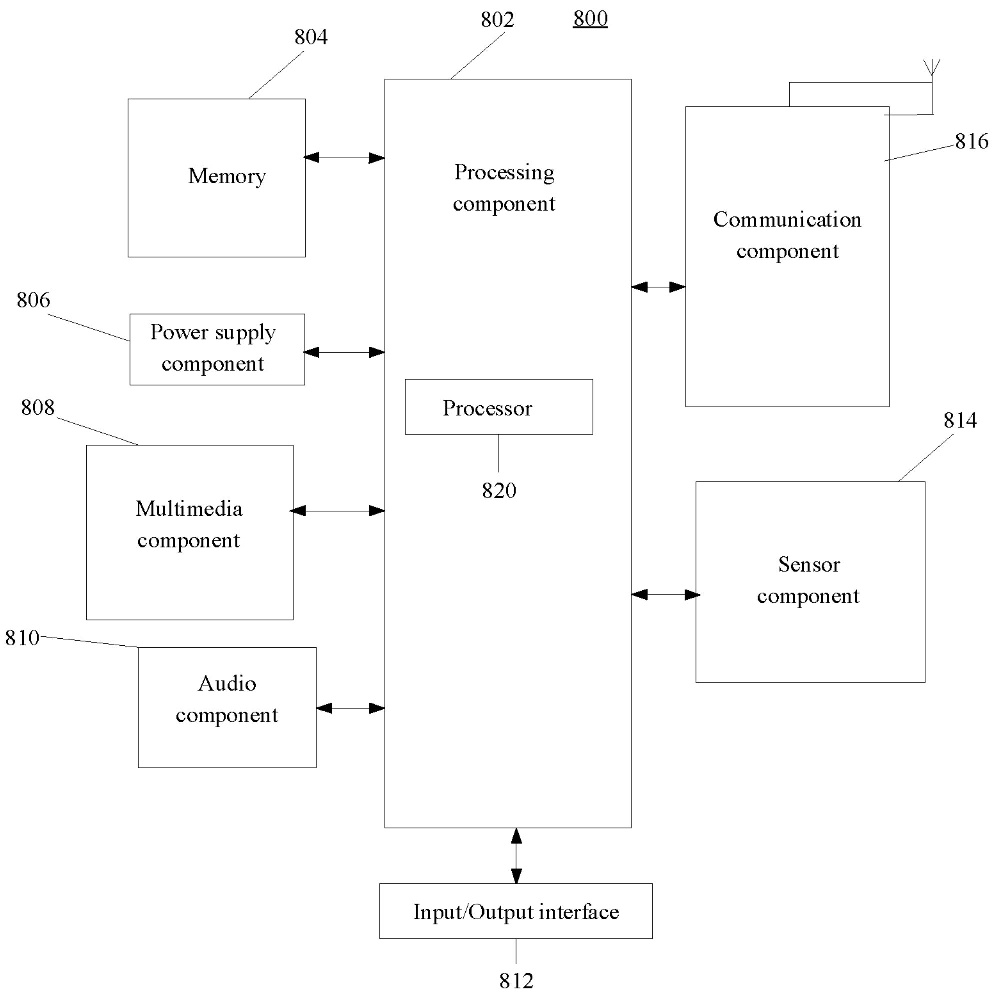
FIG. 10 is a schematic structural diagram illustrating a UE according to an embodiment of the present disclosure.

FIG. 10 is a block diagram of a UE 800 according to an embodiment of the present disclosure. For example, the UE 800 may be a mobile phone, a computer, a digital broadcast user device, a message transceiver, a game console, a tablet device, a medical device, a fitness device, a personal digital assistant, and the like.

As shown in FIG. 10, the UE 800 may include one or more of the following components: a processing component 802, a memory 804, a power supply component 806, a multimedia component 808, an audio component 810, an input/output (I/O) interface 812, a sensor component 814, and a communication component 816.

The processing component 802 generally controls overall operations of the UE 800, such as operations associated with display, phone calls, data communications, camera operations, and recording operations. The processing component 802 may include one or more processors 820 to execute instructions to complete all or part of the steps of the above methods. In addition, the processing component 802 may include one or more modules that facilitate the interaction between the processing component 802 and other components. For example, the processing component 802 may include a multimedia module to facilitate the interaction between the multimedia component 808 and the processing component 802.

The memory 804 is configured to store various types of data to support the operation of the UE 800. Examples of such data include instructions for any application program or method operated on the UE 800, contact data, phonebook data, messages, pictures, videos, and so on. The memory 804 may be implemented by any type of volatile or non-volatile storage devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or compact disk.

The power supply component 806 supplies power for different components of the UE 800. The power supply component 806 may include a power supply management system, one or more power supplies, and other components associated with generating, managing and distributing power for the UE 800.

The multimedia component 808 includes a screen that provides an output interface between the UE 800 and a user.

In some examples, the screen may include a liquid crystal display (LCD) and a touch panel (TP). If the screen includes a touch panel, the screen may be implemented as a touch screen to receive input signals from the user. The touch panel includes one or more touch sensors to sense touches, slides, and gestures on the touch panel. The touch sensor may not only sense the boundary of touch or slide actions but also detect the duration and pressure associated with touch or slide operations. In some examples, the multimedia component 808 includes a front camera and/or a rear camera. When the UE 800 is in an operation mode, such as a shooting mode or a video mode, the front camera and/or the rear camera may receive external multimedia data. Each of the front and rear cameras may be a fixed optical lens system or have a focal length and an optical zoom capability.

The audio component 810 is configured to output and/or input audio signals. For example, the audio component 810 includes a microphone (MIC) configured to receive an external audio signal when the UE 800 is in an operation mode, such as a call mode, a recording mode, and a voice recognition mode. The received audio signal may be further stored in the memory 804 or transmitted via the communication component 816. In some examples, the audio component 810 also includes a loudspeaker for outputting an audio signal.

The I/O interface 812 provides an interface between the processing component 802 and a peripheral interface module, which may be a keyboard, a click wheel, a button, or the like. These buttons may include, but are not limited to a home button, a volume button, a start button, and a lock button.

The sensor component 814 includes one or more sensors for providing a status assessment in various aspects to the UE 800. For example, the sensor component 814 may detect an open/closed state of the UE 800, and the relative positioning of the component, for example, the component is a display and a keypad of the UE 800. The sensor component 814 may also detect a change in position of the UE 800 or a component of the UE 800, the presence or absence of a user in contact with the UE 800, the orientation or acceleration/deceleration of the UE 800, and a change in temperature of the UE 800. The sensor component 814 may include a proximity sensor configured to detect the presence of nearby objects without any physical contact. The sensor component 814 may also include a light sensor, such as a CMOS or CCD image sensor, for use in imaging applications. In some examples, the sensor component 814 may also include an acceleration sensor, a gyro sensor, a magnetic sensor, a pressure sensor, or a temperature sensor.

The communication component 816 is configured to facilitate wired or wireless communication between the UE 800 and other devices. The UE 800 may access a wireless network based on a communication standard, such as WiFi, 2G or 3G, or a combination thereof. In an example, the communication component 816 receives broadcast signals or broadcast-associated information from an external broadcast management system via a broadcast channel. In an example, the communication component 816 also includes a near field communication (NFC) module to facilitate short-range communication. For example, the NFC module may be implemented based on a radio frequency identification (RFID) technology, an infrared data association (IrDA) technology, an ultrawideband (UWB) technology, a Bluetooth (BT) technology, and other technologies.

In an example, the UE 800 may be implemented by one or more of an application specific integrated circuit (ASIC), a digital signal processor (DSP), a digital signal processing device (DSPD), a programmable logic device (PLD), a field programmable gate array (FPGA), a controller, a microcontroller, a microprocessor or other electronic elements for performing the above methods.

In an embodiment, there is also provided a non-transitory computer-readable storage medium including instructions, such as a memory 804 including instructions, where the instructions are executable by the processor 820 of the UE 800 to perform the method as described above. For example, the non-transitory computer-readable storage medium may be a Read Only Memory (ROM), a Random Access Memory (RAM), a CD-ROM, a magnetic tape, a floppy disk, an optical data storage device, and the like.

Figure 11:
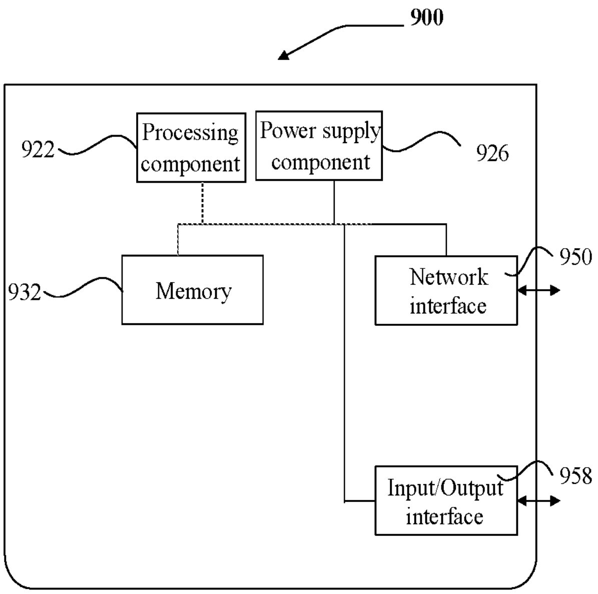
FIG. 11 is a schematic structural diagram illustrating an access device according to an embodiment of the present disclosure.

As shown in FIG. 11, an embodiment of the present disclosure provides a structure of an access device. For example, the access device 900 may be provided as a network-side device.

As shown in FIG. 11, the access device 900 may include a processing component 922, which further includes one or more processors (not shown) and memory resources represented by memory 932 for storing instructions executable by the processing component 922, for example, an application program. The application program stored in the memory 932 may include one or more modules, each of which corresponds to one set of instructions. Further, the processing component 922 is configured to execute instructions to perform the above methods, for example, at least one of the methods shown in FIGS. 2A to 2C, 3A to 3C and 4 to 5.

The access device 900 further includes a power supply component 926 configured to execute power management for the access device 900, one wired or wireless network interface 950 configured to connect the access device 900 to a network, and one input/output (I/O) interface 958. The access device 900 may be operated based on an operating system stored in the memory 932, such as Windows Server™, Mac OS X™, Unix™, Linux™, FreeBSD™ or the like.

The embodiments of the present disclosure provide the technical solution for the preset type of UE to consider that the UE does not support or does not expect to receive the SDT and listen the paging message on the same time unit of different initial DL BWPs, and will configure the downlink transmission of the SDT and the paging message on the same initial DL BWPs or on different time units of different initial DL BWPs, so as to solve the problem that the preset type of UE does not support or does not expect to receive the SDT and listening to the paging message on the same time unit of different initial DL BWPs, thereby ensuring the receipt success rate of the downlink transmission of the SDT and the paging message for the preset type of UE.

Other implementations of the present disclosure will be apparent to those skilled in the art from consideration of the specification and practice of the present disclosure herein. The present disclosure is intended to cover any variations, uses, modifications, or adaptations of the present disclosure that follow the general principles thereof and include common knowledge or conventional technical means in the related art that are not disclosed in the present disclosure. The specification and embodiments are considered as exemplary only, with a true scope and spirit of the present disclosure indicated by the following claims.

It is to be understood that the present disclosure is not limited to the precise structure described herein and shown in the accompanying drawings, and that various modifications and changes may be made without departing from the scope thereof. The scope of the present disclosure is limited only by the appended claims.

The invention claimed is:

1. A downlink transmission configuration method, performed by an access device, and comprising:

configuring a small data transmission (SDT) and a paging message, for a preset type of user equipment (UE), on different time units of different initial downlink (DL) bandwidth parts (BWPs);

wherein configuring the SDT and the paging message, for the preset type of UE, on the different time units of the different initial DL BWPs comprises:

configuring, based on a duration required for the preset type of UE to switch between different DL BWPs, the SDT and the paging message on the different time units of the different initial DL BWPs, wherein a time interval between a time unit for the SDT and a time unit for the paging message is greater than or equal to the duration required for the preset type of UE to switch between the different DL BWPs.

2. The method of claim 1, wherein the preset type of UE comprises at least one of:

a reduced capability UE;

a UE which is prohibited from configuring the SDT and the paging message on a same time unit of the different initial DL BWPs; or a UE which does not expect to configure the SDT and the paging message on a same time unit of the different initial DL BWPs.

3. A non-transitory computer readable storage medium, storing programs thereon, wherein the programs, when executed by a processor, cause the processor to perform the method of claim 1.

4. A downlink transmission receiving method, performed by a preset type of user equipment (UE), and comprising:

receiving a small data transmission (SDT) and a paging message on different time units of different initial downlink (DL) bandwidth parts (BWPs);

wherein a time unit for the SDT and a time unit for the paging message are configured on the different initial DL BWPs based on a duration required for the preset type of UE to switch between different DL BWPs;

wherein a time interval between the time unit for the SDT and the time unit for the paging message is greater than or equal to the duration required for the preset type of UE to switch between the different DL BWPs.

5. A communication device, comprising a processor, a transceiver, and a memory storing programs, wherein the programs, when executed by the processor, cause the processor to perform the method of claim 4.

6. A non-transitory computer readable storage medium, storing programs thereon, wherein the programs, when executed by a processor, cause the processor to perform the method of claim 4.

7. A communication device, comprising a processor, a transceiver, and a memory storing programs, wherein the programs, when executed by the processor, cause the processor to perform operations comprising:

configuring a small data transmission (SDT) and a paging message, for a preset type of user equipment (UE), on different time units of different initial downlink (DL) bandwidth parts (BWPs);

wherein configuring the SDT and the paging message, for the preset type of UE, on the different time units of the different initial DL BWPs comprises:

configuring, based on a duration required for the preset type of UE to switch between different DL BWPs, the SDT and the paging message on the different time units of the different initial DL BWPs, wherein a time interval between a time unit for the SDT and a time unit for the paging message is greater than or equal to the duration required for the preset type of UE to switch between the different DL BWPs.

* * * * *